US012681936B2

(12) United States Patent
Srinivasaraghavan et al.

(10) Patent No.: US 12,681,936 B2
(45) Date of Patent: Jul. 14, 2026

(54) SYSTEMS AND METHODS FOR GENERATING AND UTILIZING A PERSONALIZED VOCABULARY FOR SEARCH AND RECOMMENDATIONS

(71) Applicant: Verizon Patent and Licensing Inc., Basking Ridge, NJ (US)

(72) Inventors: Haripriya Srinivasaraghavan, Plano, TX (US); Anal N. Dave, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 48 days.

(21) Appl. No.: 18/478,128

(22) Filed: Sep. 29, 2023

(65) Prior Publication Data

US 2025/0110960 A1      Apr. 3, 2025

(51) Int. Cl.
| | |
|---|---|
| *G06F 16/00* | (2019.01) |
| *G06F 16/2457* | (2019.01) |
| *G06F 16/248* | (2019.01) |
| *G06F 16/28* | (2019.01) |
| *G06F 16/901* | (2019.01) |
| *G06N 5/022* | (2023.01) |

(52) U.S. Cl.
CPC ........ *G06F 16/2457* (2019.01); *G06F 16/248* (2019.01); *G06F 16/288* (2019.01); *G06F 16/9024* (2019.01); *G06N 5/022* (2013.01)

(58) Field of Classification Search
CPC .. G06F 16/2457; G06F 16/288; G06F 16/248; G06F 16/9024; G06N 5/022
USPC ........................................................... 707/722
See application file for complete search history.

(56) References Cited

U.S. PATENT DOCUMENTS

| | | | |
|---|---|---|---|
| 2019/0042988 A1* | 2/2019 | Brown | G06F 16/9535 |
| 2024/0232265 A9* | 7/2024 | Zhang | G06F 16/367 |

* cited by examiner

*Primary Examiner* — Raquel Perez-Arroyo

(57) ABSTRACT

A device may receive global metadata terms and aliases, group level metadata terms and aliases, and user level metadata terms and aliases, and may generate global metadata graphs, group level metadata graphs, and user level metadata graphs. The device may train natural language understanding (NLU) models with the global metadata graphs, the group level metadata graphs, and the user level metadata graphs to generate trained NLU models, and may receive a search request from a user. The device may assign a level to the user and an identifier within the level based on a confidence and prior interactions associated with the user, and may select an NLU model from the trained NLU models based on the level and the identifier assigned to the user. The device may process the search request, with the NLU model, to generate search results, and may perform actions based on the search results.

20 Claims, 11 Drawing Sheets

500

510 — Receive global metadata terms and aliases, group level metadata terms and aliases, and user level metadata terms and aliases 520 — Generate global metadata graphs, group level metadata graphs, and user level metadata graphs 530 — Train natural language understanding (NLU) models with one or more of the global metadata graphs, the group level metadata graphs, and the user level metadata graphs to generate trained NLU models 540 — Receive a search request from a user 550 — Assign a level to the user and an identifier within the level based on a confidence and prior interactions associated with the user 560 — Select an NLU model from the trained NLU models based on the level and the identifier assigned to the user 570 — Process the search request, with the NLU model, to generate search results 580 — Perform one or more actions based on the search results

100

Provide the search results for display to the user

Modify one or more of the global metadata graphs, the group level metadata graphs, or the user level metadata graphs based on the search results Utilize the search results with a video streaming service or a music streaming service Utilize the search results with an online store or a personal assistant application Retrain one or more of the trained NLU models based on the search results

160

Perform one or more actions based on the search results

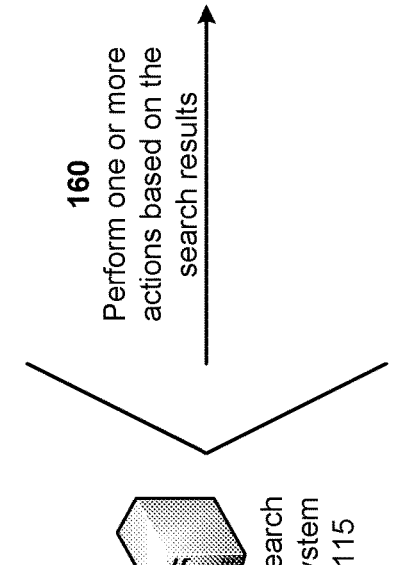

Search system 115

FIG. 1G

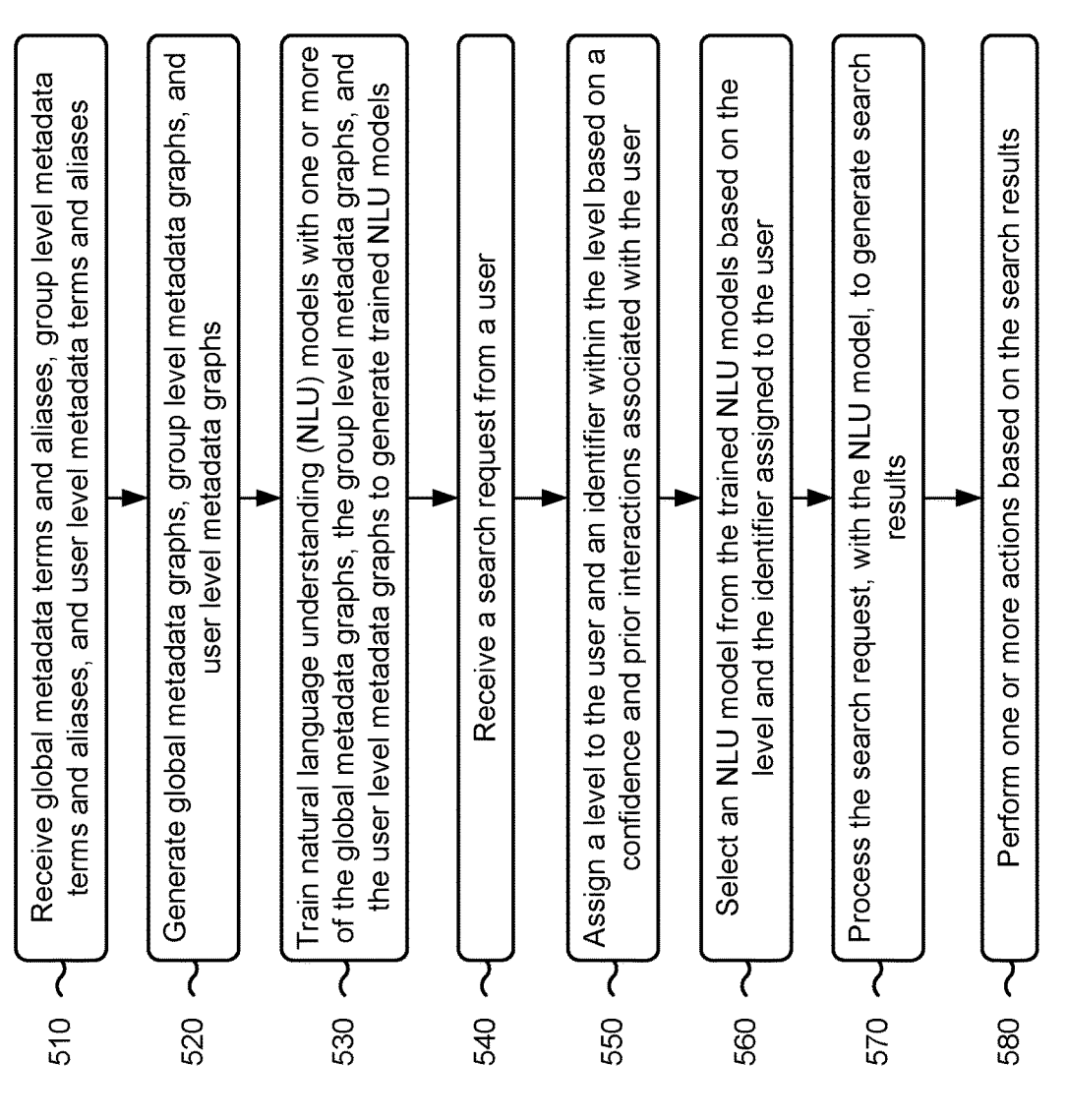

510 — Receive global metadata terms and aliases, group level metadata terms and aliases, and user level metadata terms and aliases 520 — Generate global metadata graphs, group level metadata graphs, and user level metadata graphs 530 — Train natural language understanding (NLU) models with one or more of the global metadata graphs, the group level metadata graphs, and the user level metadata graphs to generate trained NLU models 540 — Receive a search request from a user 550 — Assign a level to the user and an identifier within the level based on a confidence and prior interactions associated with the user 560 — Select an NLU model from the trained NLU models based on the level and the identifier assigned to the user 570 — Process the search request, with the NLU model, to generate search results 580 — Perform one or more actions based on the search results

SYSTEMS AND METHODS FOR GENERATING AND UTILIZING A PERSONALIZED VOCABULARY FOR SEARCH AND RECOMMENDATIONS

BACKGROUND

Natural language understanding (NLU) is a subset of natural language processing (NLP), which uses syntactic and semantic analysis of text and speech to determine a meaning of a sentence. "Syntax" refers to the grammatical structure of the sentence, while "semantics" refers to an intended meaning of the sentence. NLU establishes a relevant ontology that specifies relationships between words and phrases.

BRIEF DESCRIPTION OF THE DRAWINGS

FIGS. 1A-1G are diagrams of an example associated with generating and utilizing a personalized vocabulary for searches and recommendations.

FIG. 5 is a flowchart of an example process for generating and utilizing a personalized vocabulary for searches and recommendations.

DETAILED DESCRIPTION OF EXAMPLE EMBODIMENTS

Figure 1A:
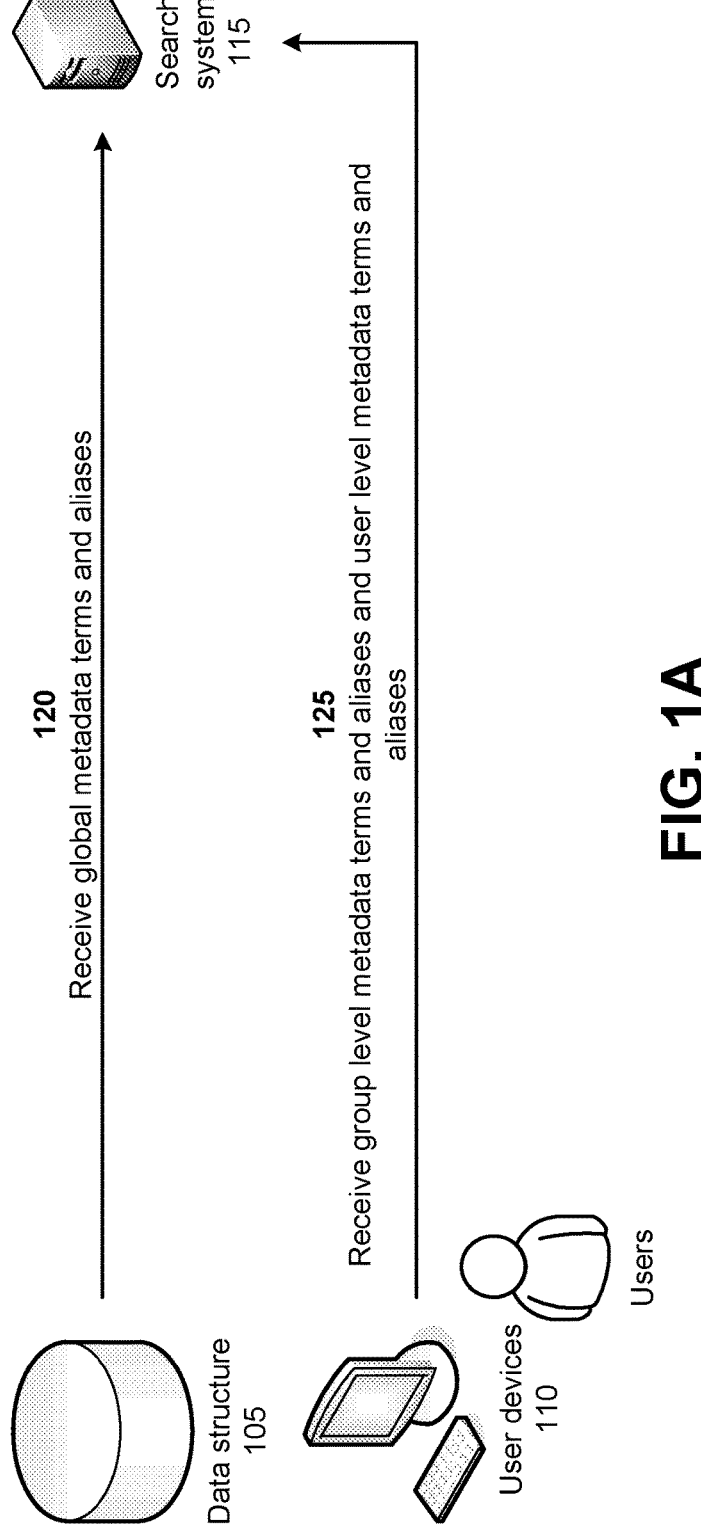

The following detailed description of example implementations refers to the accompanying drawings. The same reference numbers in different drawings may identify the same or similar elements.

Natural-language-based interactions (e.g., voice searches, interactive chats, and/or the like) are very intuitive for an end user. However, different people interact in different ways and have varying vocabulary when interacting with natural language assistants and natural language search engines even when using the same language (e.g., English, Spanish, and/or the like). Media systems serve users with different areas and levels of interest. Users naturally use detailed vocabulary for their interests and use general vocabulary for other areas. Some users may be general sports enthusiasts, while other users may be interested in specific sports or leagues. Some users may be avid news watchers, while other users may be interested in science fiction or in a particular genre and may use more terms related to their interest areas. Thus, the same terms may mean different things at different times for different users (e.g., "cowboys" may mean a football team to some users and a western television show or movie to other users). However, most media systems use a one-size-fits-all user vocabulary for searches and recommendations.

Thus, current techniques for performing searches and providing recommendations consume computing resources (e.g., processing resources, memory resources, communication resources, and/or the like), networking resources, and/or other resources associated with providing incorrect search results and/or recommendations based on not understanding user search terms, providing a poor user experience due to the incorrect search results and/or recommendations, performing searches based on misinterpreted user search terms, and/or the like.

Some implementations described herein provide a search system that generates and utilizes a personalized vocabulary for search and recommendations. For example, the search system may receive global metadata terms and aliases, group level metadata terms and aliases, and user level metadata terms and aliases, and may generate global metadata graphs based on the global metadata terms and aliases, group level metadata graphs based on the group level metadata terms and aliases, and user level metadata graphs based on the user level metadata terms and aliases. The search system may train natural language understanding (NLU) models with the global metadata graphs, the group level metadata graphs, and the user level metadata graphs to generate trained NLU models, and may receive a search request from a user. The search system may assign a level to the user and an identifier within the level based on a confidence and prior interactions associated with the user, and may select an NLU model from the trained NLU models based on the level and the identifier assigned to the user. The search system may process the search request, with the NLU model, to generate search results, and may perform one or more actions based on the search results.

In some implementations, the search system may identify a previous user level and may move above or below in the previous user level for a current search based on previous context (e.g., a the previous user level, a previous identifier, and/or the like), a previous user interaction after search results, and a new search query. For example, for a user input of "cowboys," the search system may assign the input to a global level with an identifier "cowboys" as a topic, and may provide results for display. If the user searches again without picking a result with "cowboys games," the search system may reassign a group level and national football league (NFL) users based on a previous level and/or identifier and interactions of the NFL users with the search results.

In this way, the search system generates and utilizes a personalized vocabulary for search and recommendations. For example, the search system may learn and utilize a personalized vocabulary for users to interact with when seeking search results and/or recommendations (e.g., from media systems). In addition to learning a personalized vocabulary for each user, the search system may switch between different levels of vocabulary based on context, current depth of a search, availability of data about the user, and/or the like. The search system may receive an initial set of terms for various entity types that are used in user searches (e.g., a media entity may be associated with terms such as channel names, movie and show titles, genre names, topic or keyword names, team names, league names, sports genre names, and/or the like). The search system may utilize the set of terms to generate a graph with interconnecting terms and term relationships (e.g., "is a", "has a", "relates to", "also known as", and/or the like). Based on user interactions, the search system may prune the original graph or may extend the original graph in specific areas with vocabulary that is used in or related to user interest areas. Thus, the search system may conserve computing resources, networking resources, and/or other resources that would have otherwise been consumed by providing incorrect search results and/or recommendations based on not understanding user search terms, providing a poor user experience due to the incorrect search results and/or recommendations, performing searches based on misinterpreted user search terms, and/or the like.

FIGS. 1A-1G are diagrams of an example 100 associated with generating and utilizing a personalized vocabulary for searches and recommendations. As shown in FIGS. 1A-1G, example 100 includes a data structure 105 and a plurality of user devices 110 associated with a search system 115. Further details of the data structure 105, the user devices 110, and the search system 115 provided elsewhere herein.

As shown in FIG. 1A, and by reference number 120, the search system 115 may receive global metadata terms and aliases. For example, the data structure 105 (e.g., a database, a table, a list, and/or the like) may store the global metadata terms and aliases. The global metadata terms may include terms for various entity types that are used in user searches. For example, for a media entity, the global metadata terms may include channel names, movie and show titles, genre names, topic or keyword names, team names, league names, sports genre names, and/or the like. The global metadata aliases may include aliases of one or more of the global metadata terms for the various entity types that are used in user searches. For example, for a sport's team name (e.g., Philadelphia Eagles), the global metadata aliases may include aliases, such as "the Birds," "the Iggles," "Gang Green," and/or the like. The data structure 105 may provide the global metadata terms and aliases to the search system 115, and the search system 115 may receive the global metadata terms and aliases from the data structure 105. The search system 115 may continuously receive the global metadata terms and aliases from the data structure 105, may periodically receive the global metadata terms and aliases from the data structure 105, may receive the global metadata terms and aliases from the data structure 105 based on requesting the global metadata terms and aliases from the data structure 105, and/or the like.

As further shown in FIG. 1A, and by reference number 125, the search system 115 may receive group level metadata terms and aliases and user level metadata terms and aliases. For example, the data structure 105 may store the group level metadata terms and aliases and the user level metadata terms and aliases based on user searches conducted by users of the user devices 110. The data structure 105 may provide the group level metadata terms and aliases and the user level metadata terms and aliases to the search system 115, and the search system 115 may receive the group level metadata terms and aliases and the user level metadata terms and aliases from the data structure 105. Alternatively, or additionally, the users may utilize the user devices 110 to conduct user searches via the search system 115, and the search system 115 may receive the group level metadata terms and aliases and the user level metadata terms and aliases from the user devices 110 based on the user searches. The group level metadata terms may include terms for various group types that are used in user searches. For example, for a media entity, the group level metadata terms may include group names that prefer particular channels, movies, shows, genres, topics, keywords, teams, leagues, sports, and/or the like. The group level metadata aliases may include aliases of one or more of the group level metadata terms for the various group types that are used in user searches. For example, for a group name (e.g., football fans), the group level metadata aliases may include aliases, such as pigskin fans, NFL fans, gridiron fans, and/or the like.

The user level metadata terms may include terms for various users that conduct user searches. For example, for a media entity, the user level metadata terms may include names of users that prefer particular channels, movies, shows, genres, topics, keywords, teams, leagues, sports, and/or the like. The user level metadata aliases may include aliases of one or more of the user level metadata terms for the various users that conduct user searches. For example, for a user that is a football fan, the user level metadata aliases may include aliases, such as number one football fan, Eagles fan, and/or the like.

The search system 115 may continuously receive the group level metadata terms and aliases and the user level metadata terms and aliases from the data structure 105 and/or the user devices 110, may periodically receive the group level metadata terms and aliases and the user level metadata terms and aliases from the data structure 105 and/or the user devices 110, may receive the group level metadata terms and aliases and the user level metadata terms and aliases from the data structure 105 and/or the user devices 110 based on requesting the group level metadata terms and aliases and the user level metadata terms and aliases from the data structure 105 and/or the user devices 110, and/or the like.

Figure 1B:
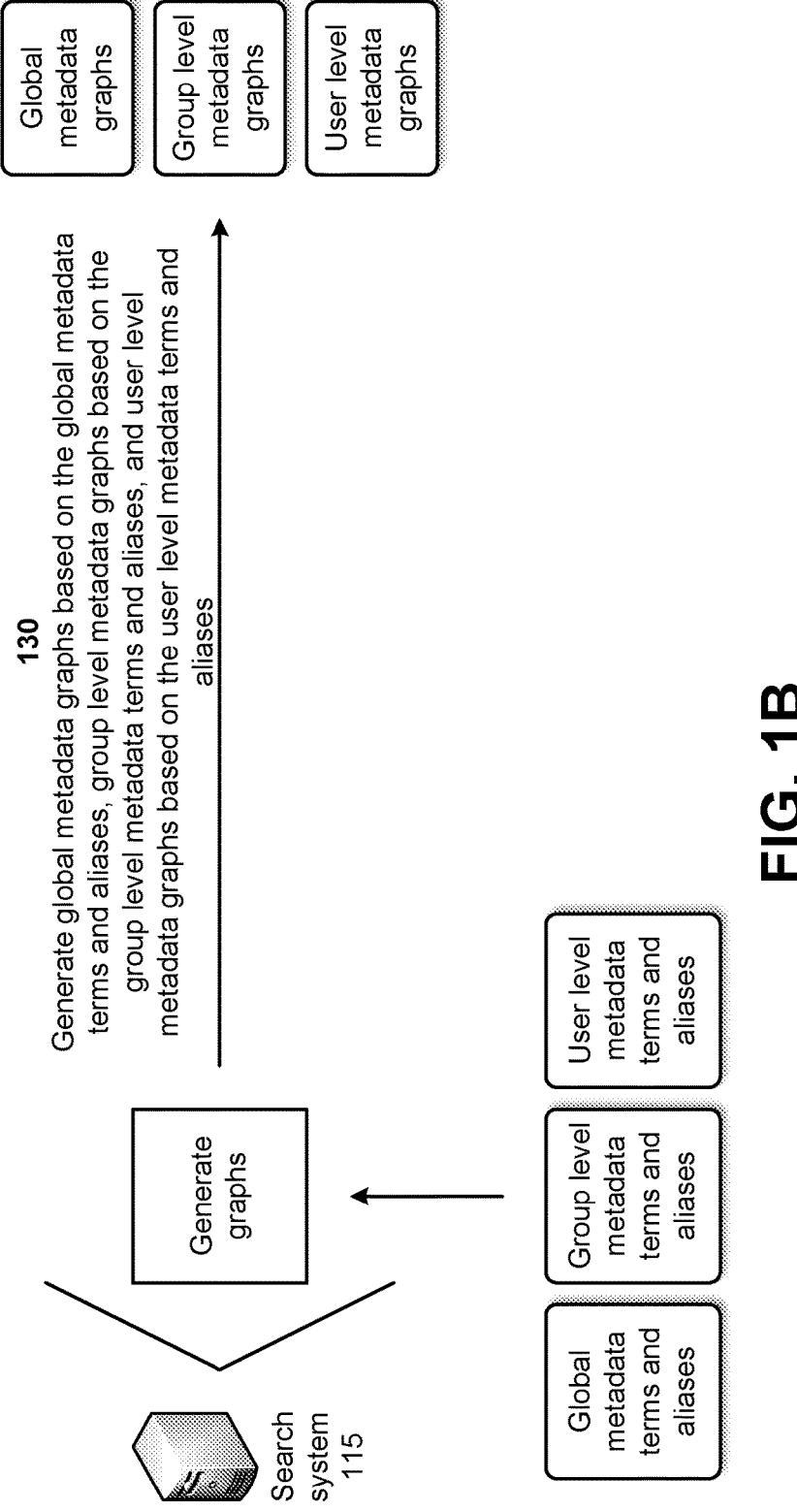

As shown in FIG. 1B, and by reference number 130, the search system 115 may generate global metadata graphs based on the global metadata terms and aliases, group level metadata graphs based on the group level metadata terms and aliases, and user level metadata graphs based on the user level metadata terms and aliases. For example, the search system 115 may generate knowledge graphs (e.g., the global metadata graphs) based on the global metadata terms and aliases. A knowledge graph, also known as a semantic network, represents a network of real-world entities (e.g., objects, events, situations, concepts, and/or the like) and illustrates relationships between the real-world entities. A knowledge graph may include nodes and edges. Any object, place, or person may be a node, and an edge may define a relationship between the nodes. Thus, the global metadata graphs may represent the global metadata terms and aliases as well as relationships between the global metadata terms and aliases. The global metadata graphs may include nodes representing the global metadata terms and aliases. The nodes may be interconnected by edges representing the relationships between the global metadata terms and aliases.

The search system 115 may generate knowledge graphs (e.g., the group level metadata graphs) based on the group level metadata terms and aliases. The group level metadata graphs may represent the group level metadata terms and aliases as well as relationships between the group level metadata terms and aliases. The group level metadata graphs may include nodes representing the group level metadata terms and aliases. The nodes may be interconnected by edges representing the relationships between the group level metadata terms and aliases. The search system 115 may generate knowledge graphs (e.g., the user level metadata graphs) based on the user level metadata terms and aliases. The user level metadata graphs may represent the user level metadata terms and aliases as well as relationships between the user level metadata terms and aliases. The user level metadata graphs may include nodes representing the user level metadata terms and aliases. The nodes may be interconnected by edges representing the relationships between the user level metadata terms and aliases.

Figure 1C:
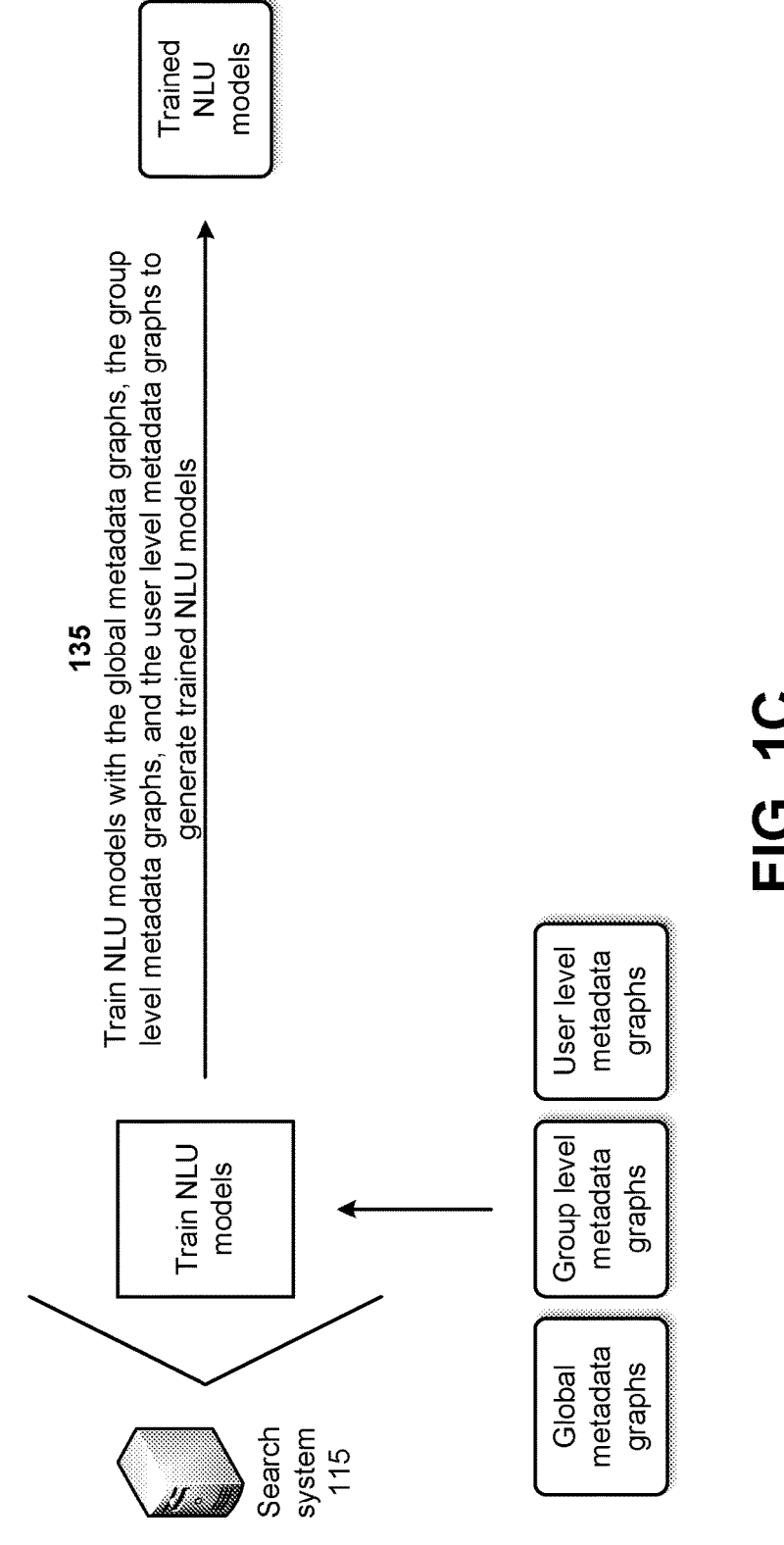

As shown in FIG. 1C, and by reference number 135, the search system 115 may train NLU models with the global metadata graphs, the group level metadata graphs, and the user level metadata graphs to generate trained NLU models. For example, the search system 115 may be associated with multiple NLU models and may select one of the multiple NLU models for generating search results for a particular search query based on particular attributes associated with a user submitting the search query. Each of the NLU models, when trained, may utilize the global, group level, and user level metadata terms and aliases to translate user utterances into search queries. Each NLU model may understand a user's utterance associated with specific concepts based on the global, group level, and user level metadata terms and aliases. Thus, the search system 115 may utilize the global metadata graphs, the group level metadata graphs, and the user level metadata graphs to train the NLU models and to generate the trained NLU models. Further details of training a machine learning model, such as each of the NLU models, is provided below in connection with FIG. 2.

Each trained NLU model may utilize syntactic and semantic analysis of text and speech to determine a meaning of a sentence. "Syntax" refers to the grammatical structure of the sentence, while "semantics" refers to an intended meaning of the sentence. Each trained NLU model may establish a relevant ontology that specifies relationships between words and phrases. A trained NLU model may receive a search request and may perform a syntactic and semantic analysis of the search request to determine a meaning of the search request. The trained NLU model may generate search results based on the determined meaning of the search request.

Figure 1D:
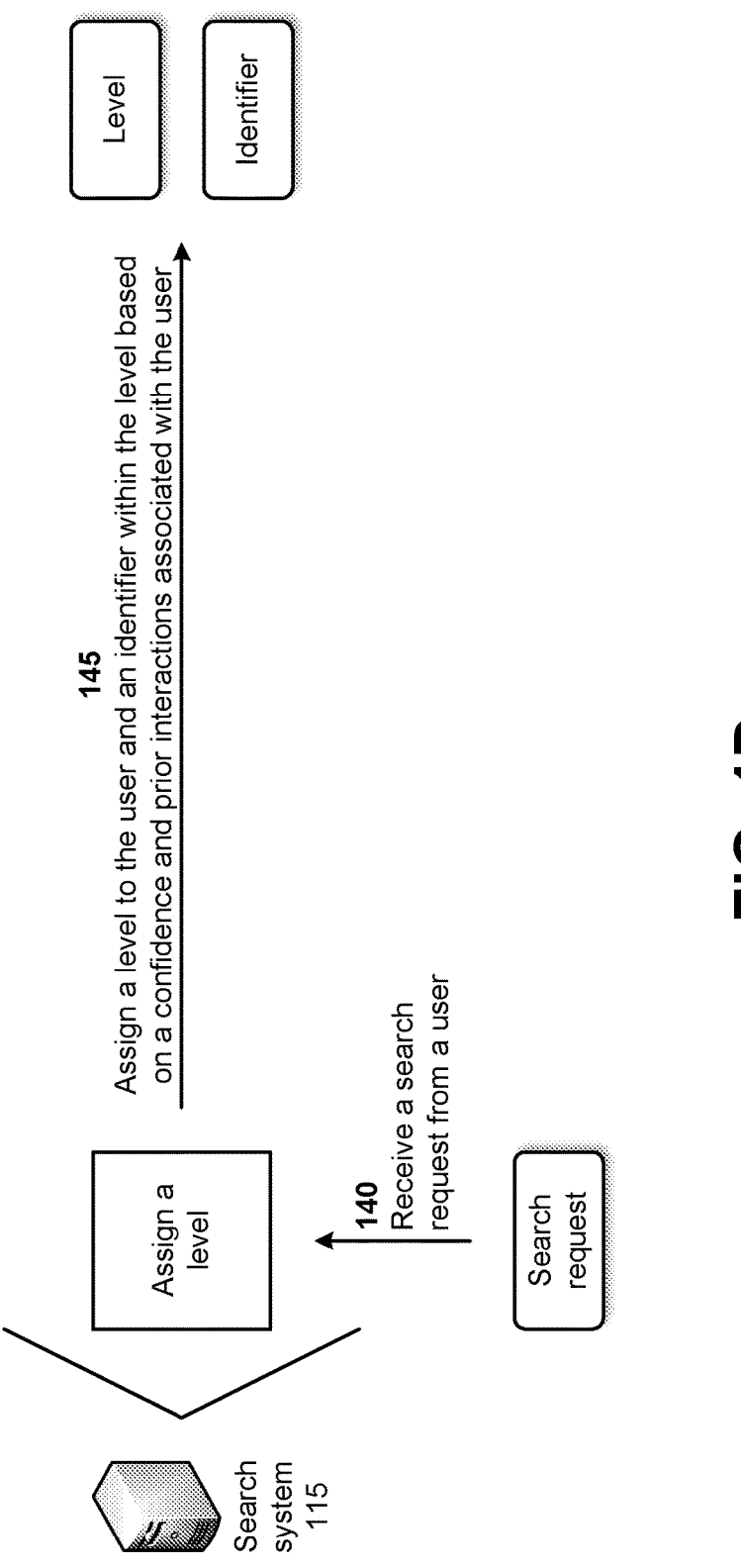

As shown in FIG. 1D, and by reference number 140, the search system 115 may receive a search request from a user. For example, a user of a user device 110 may utilize the user device 110 to enter a search request and to provide the search request to the search system 115. The search system 115 may receive the search request from the user device 110. In one example, the search request may be associated with a media system and may request that the media system display all action movies available at a particular time.

As further shown in FIG. 1D, and by reference number 145, the search system 115 may assign a level to the user and an identifier within the level based on a confidence and prior interactions associated with the user. For example, when the search system 115 receives the search request (e.g., or when the user connects to the search system), the search system 115 may determine confidence scores associated with previous interactions of the user with the search system 115, and may assign a level to the user based on the confidence scores. The search system 115 may also assign an identifier (e.g., of the user) within the assigned level, which may be utilized for selecting one of the trained NLU models to process the search request. In some implementations, the search system 115 may translate a user-specific term in the search request to a common term and may utilize the common term with a common graph (e.g., a global metadata graph) and a trained NLU model associated with the common graph.

Figure 1E:
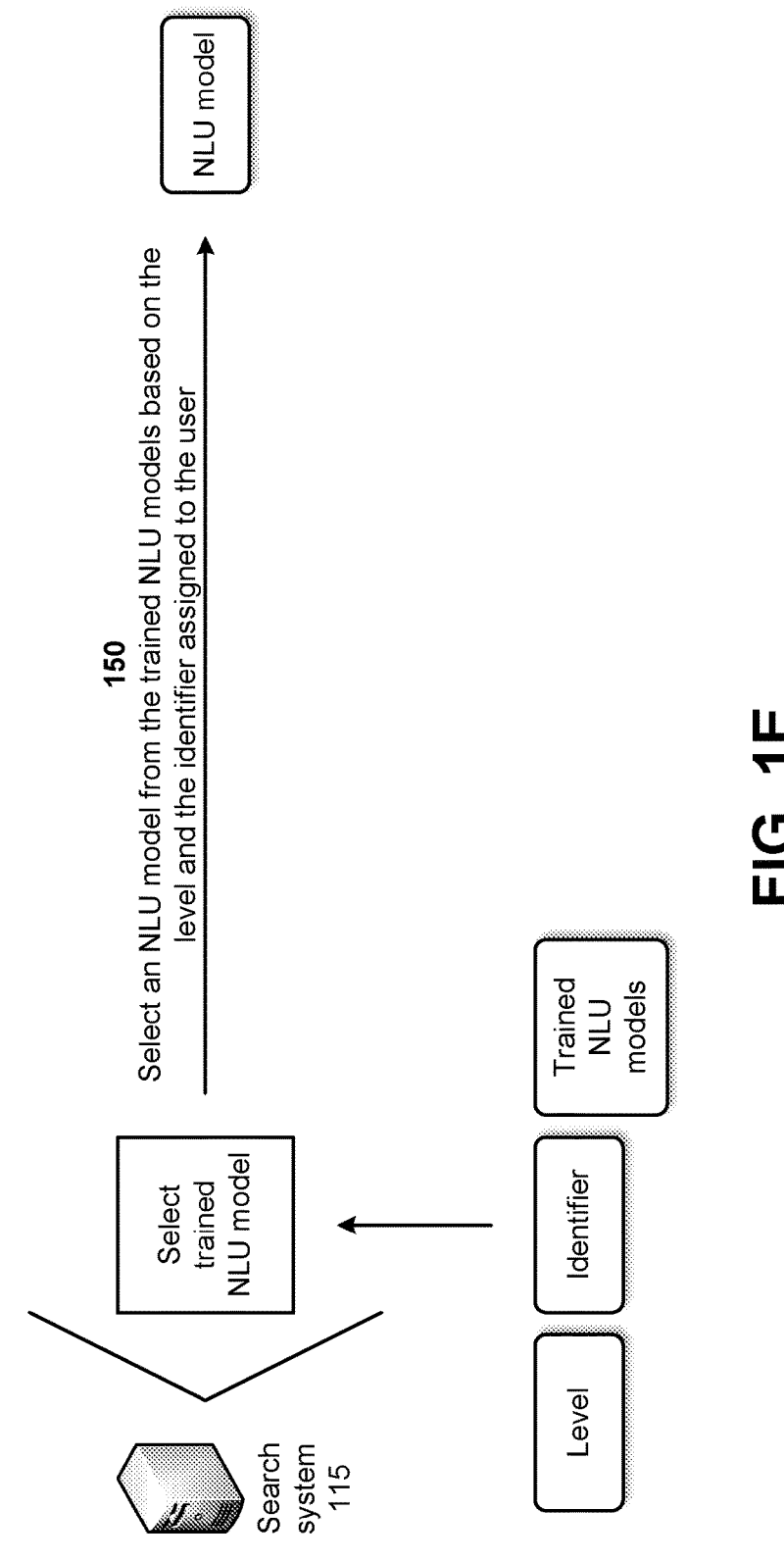

As shown in FIG. 1E, and by reference number 150, the search system 115 may select an NLU model from the trained NLU models based on the level and the identifier assigned to the user. For example, the search system 115 may utilize the level and the identifier assigned to the user to select, from the trained NLU models, the NLU model for processing the search request. In some implementations, the search requests and the search results may vary based on which trained NLU model is selected for the user, and the various trained NLU models may provide an adaptive set of highly personalized search results.

Figure 1F:
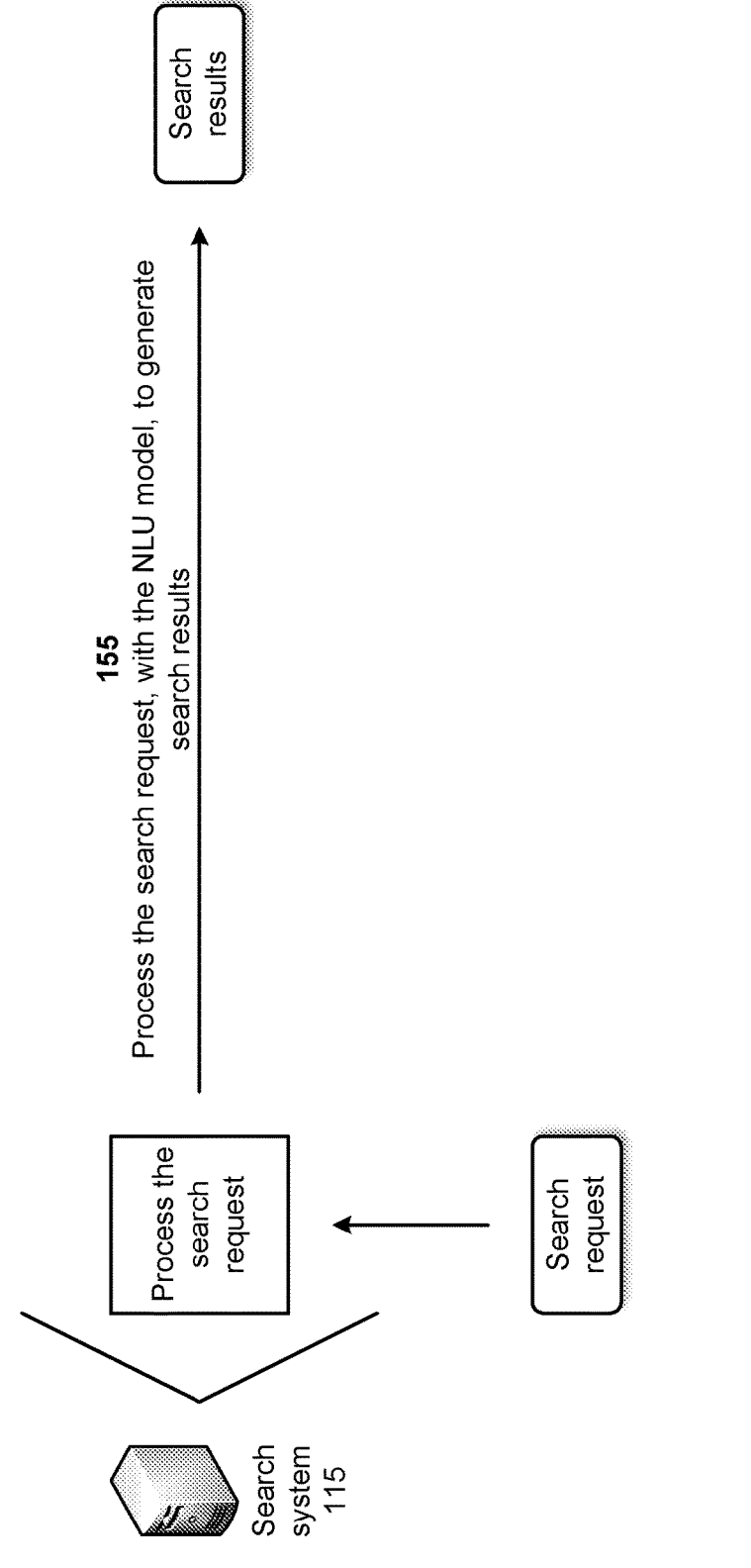

As shown in FIG. 1F, and by reference number 155, the search system 115 may process the search request, with the NLU model, to generate search results. For example, the search system 115 may input the search request to the NLU model, and the NLU model may process the search request to generate the search results. In one example, if the search request includes a request for all action movies available at a particular time, the search results may include a list of all action movies available at the particular time and details associated with the action movies. The search results for a natural language search or term search may be tailored to a domain of interest of the user or a group of the user so that the user may identify topics faster and more efficiently.

In some implementations, the selected NLU model may be utilized with a general purpose search request that includes a higher degree of ambiguity. The search system 115 may thus handle search requests tailored to how people actually talk to each other. For example, users do not always explain the full context when talking to each other, but utilize implicit content built from previous sentences in a session or context based on previous interactions (e.g., a request for "who are the top nominees" during the Academy Awards week may mean something specific to movie watchers). This may reduce verbosity of commands or natural language interactions with the search system 115.

In some implementations, the search system 115 may utilize different sets of terms and aliases for different days or different times of day, to reflect a current probability of the terms being used. The search system 115 may share the global metadata terms and aliases, the group level metadata terms and aliases, the user level metadata terms and aliases, the global metadata graphs, the group level metadata graphs, and/or the user level metadata graphs with other systems (e.g., with user consent), such as a personal assistant system, an online store or marketplace, a music streaming service, a bookstore, and/or the like. In some implementations, in addition to storing the global metadata terms and aliases, the group level metadata terms and aliases, the user level metadata terms and aliases, the global metadata graphs, the group level metadata graphs, and/or the user level metadata graphs, the search system 115 may store full commands and sentences that users are likely to use, so that interaction with the search system 115 may be more efficient (e.g., a search request of "Jason after school" from a parent may indicate to search and list after-school activities for a particular child for that day).

In some implementations, the search system 115 may modify the group level metadata graphs and/or the user level metadata graphs over time. For example, the search system 115 may receive user interactions (e.g., various search requests) with the search system 115 over time, and may modify one or more of the group level metadata graphs or one or more of the user level metadata graphs based on the user interactions. When modifying the one or more of the group level metadata graphs or the one or more of the user level metadata graphs, the search system 115 may add one or more new group level metadata terms and aliases (e.g., new nodes) to the one or more of the group level metadata graphs or may add one or more new user level metadata terms and aliases (e.g., new nodes) to the one or more of the user level metadata graphs.

In some implementations, when modifying the one or more of the group level metadata graphs or the one or more of the user level metadata graphs, the search system 115 may remove one or more group level metadata terms and aliases (e.g., existing nodes) from the one or more of the group level metadata graphs or may remove one or more user level metadata terms and aliases (e.g., existing nodes) from the one or more of the user level metadata graphs. For example, if a user or group are not using a particular term or alias, the particular term or alias should be forgotten over time. The search system 115 may utilize a dampening function that reduces edge weights associated with the particular term or alias. When an edge weight is very low, the search system 115 may prune the edge (e.g., remove the link and the node) or may set weights for the edge and the node to zero.

In some implementations, the search system 115 may receive user interactions (e.g., various search requests) with the search system 115 over time, and may relink one or more group level metadata terms and aliases in the one or more of the group level metadata graphs based on the user interactions and/or may relink one or more user level metadata terms and aliases in the one or more of the user level metadata graphs based on the user interactions.

As shown in FIG. 1G, and by reference number 160, the search system may perform one or more actions based on the search results. In some implementations, when performing the one or more actions, the search system 115 may provide the search results for display to the user. For example, the search system 115 may provide the search results to the user device 110 associated with the user, and the user device 110 may display the search results to the user. As described above, the search results may be tailored to the user based on attributes of the user. In this way, the search system 115 may conserve computing resources, networking resources, and/or other resources that would have otherwise been consumed by providing incorrect search results and/or recommendations based on not understanding user search terms.

In some implementations, when performing the one or more actions, the search system 115 may modify one or more of the global metadata graphs, the group level metadata graphs, or the user level metadata graphs based on the search results. For example, as described above, the search system 115 may modify one or more of the global metadata graphs, the group level metadata graphs, or the user level metadata graphs, based on the search results, by adding terms and aliases (e.g., nodes) to the global metadata graphs, the group level metadata graphs, and/or the user level metadata graphs, removing terms and aliases (e.g., nodes) from the global metadata graphs, the group level metadata graphs, and/or the user level metadata graphs, relinking terms and aliases (e.g., nodes) of the global metadata graphs, the group level metadata graphs, and/or the user level metadata graphs, and/or the like. In this way, the search system 115 may conserve computing resources, networking resources, and/or other resources that would have otherwise been consumed by providing a poor user experience due to the incorrect search results and/or recommendations.

In some implementations, when performing the one or more actions, the search system 115 may utilize the search results with a video streaming service or a music streaming service. For example, if the search results are associated with a video streaming service or a music streaming service, the search system 115 may utilize the search results to instruct the video streaming service or the music streaming service to provide details associated with search results (e.g., videos or music identified in the search results). The search system 115 may provide the details associated with search results for display to the user via the user device 110. In this way, the search system 115 may conserve computing resources, networking resources, and/or other resources that would have otherwise been consumed by performing searches based on misinterpreted user search terms.

In some implementations, when performing the one or more actions, the search system 115 may utilize the search results with an online store or a personal assistant application. For example, if the search results are associated with an online store or a personal assistant, the search system 115 may provide the search results to the online store or the personal assistant. The online store may utilize the search results to recommend products or services to the user and the personal assistant may utilize the search results to further interact with the user. In this way, the search system 115 may conserve computing resources, networking resources, and/or other resources that would have otherwise been consumed by providing incorrect search results and/or recommendations based on not understanding user search terms, providing a poor user experience due to the incorrect search results and/or recommendations, performing searches based on misinterpreted user search terms, and/or the like.

In some implementations, when performing the one or more actions, the search system 115 may retrain one or more of the trained NLU models based on the search results. For example, the search system 115 may utilize the search results as additional training data for retraining the trained NLU models, thereby increasing the quantity of training data available for training the trained NLU models. Accordingly, the search system 115 may conserve computing resources associated with identifying, obtaining, and/or generating historical data for training the trained NLU models relative to other systems for identifying, obtaining, and/or generating historical data for training machine learning models.

In this way, the search system 115 generates and utilizes a personalized vocabulary for search and recommendations. For example, the search system 115 may learn and utilize a personalized vocabulary for users to interact with when seeking search results and/or recommendations. In addition to learning a personalized vocabulary for each user, the search system 115 may switch between different levels of vocabulary based on context, current depth of a search, availability of data about the user, and/or the like. The search system 115 may receive an initial set of terms for various entity types that are used in user searches, and may utilize the set of terms to generate a graph with interconnecting terms and term relationships. Based on user interactions, the search system 115 may prune the original graph or may extend the original graph in specific areas with vocabulary that is used or related to user interest areas. Thus, the search system 115 may conserve computing resources, networking resources, and/or other resources that would have otherwise been consumed by providing incorrect search results and/or recommendations based on not understanding user search terms, providing a poor user experience due to the incorrect search results and/or recommendations, performing searches based on misinterpreted user search terms, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
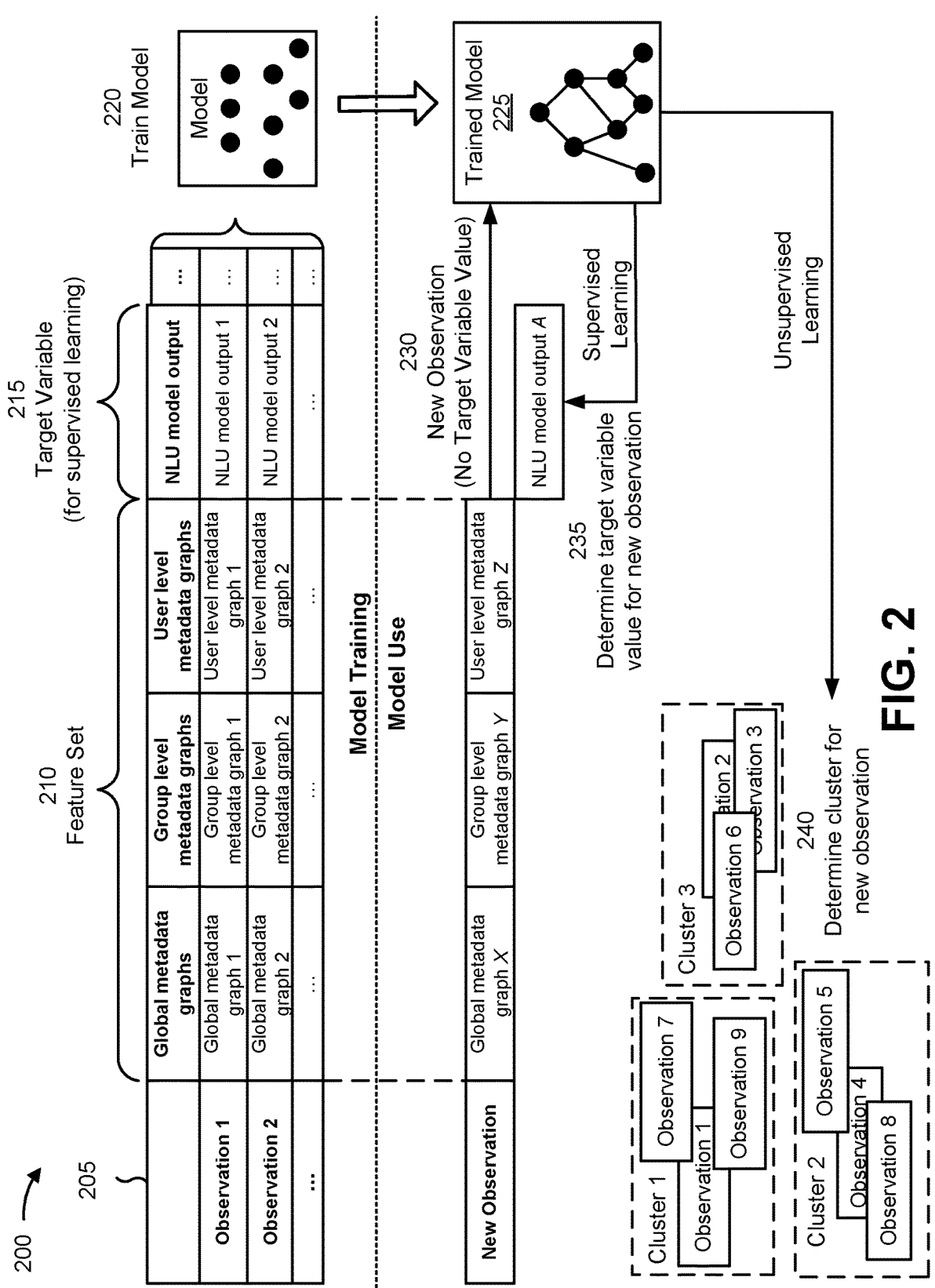
FIG. 2 is a diagram illustrating an example of training and using a machine learning model in connection with systems and methods for improving search results.

FIG. 2 is a diagram illustrating an example 200 of training and using a machine learning model in connection with systems and methods for improving search results. The machine learning model training and usage described herein may be performed using a machine learning system. The machine learning system may include or may be included in a computing device, a server, a cloud computing environment, or the like, such as the search system 115 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input), as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on the input. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of global metadata graphs, a second feature of group level metadata graphs, a third feature of user level metadata graphs, and so on. As shown, for a first observation, the first feature may have a value of global metadata graph 1, the second feature may have a value of group level metadata graph 1, the third feature may have a value of user level metadata graph 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is an NLU model output, which has a value of NLU model output 1 for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of global metadata graph X, a second feature of group level metadata graph Y, a third feature of user level metadata graph Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of NLU model output A for the target variable of the NLU model output for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a global metadata graphs cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a group level metadata graphs cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified. The recommendations, actions, and clusters described above are provided as examples, and other examples may differ from what is described above.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to improve search results. The machine learning system may enable recognition and/or identification of tens, hundreds, thousands, or millions of features and/or feature values for tens, hundreds, thousands, or millions of observations, thereby increasing accuracy and consistency and reducing delay associated with improving search results relative to requiring computing resources to be allocated for tens, hundreds, or thousands of operators to manually improve search results using the features or feature values.

As indicated above, FIG. 2 is provided is an example. Other examples may differ from what is described in connection with FIG. 2.

Figure 3:
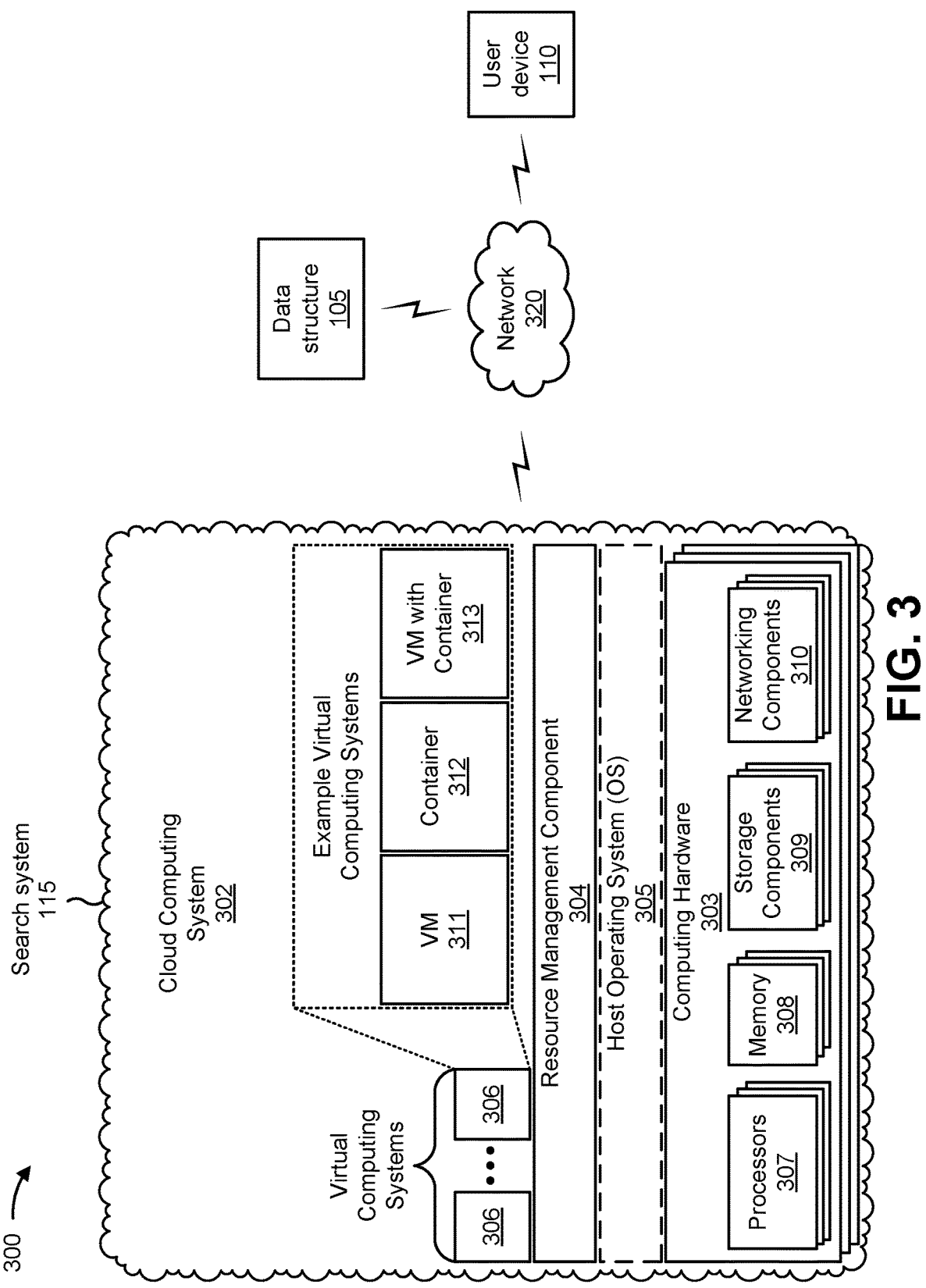
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the search system 115, which may include one or more elements of and/or may execute within a cloud computing system 302. The cloud computing system 302 may include one or more elements 303-313, as described in more detail below. As further shown in FIG. 3, the environment 300 may include the data structure 105, the user device 110, and/or a network 320. Devices and/or elements of the environment 300 may interconnect via wired connections and/or wireless connections.

The data structure 105 may include one or more devices capable of receiving, generating, storing, processing, and/or providing information, as described elsewhere herein. The data structure 105 may include a communication device and/or a computing device. For example, the data structure 105 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 105 may communicate with one or more other devices of the environment 300, as described elsewhere herein.

The user device 110 may include one or more devices capable of receiving, generating, storing, processing, and/or providing information, as described elsewhere herein. The user device 110 may include a communication device and/or a computing device. For example, the user device 110 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the search system 115 may include one or more elements 303-313 of the cloud computing system 302, may execute within the cloud computing system 302, and/or may be hosted within the cloud computing system 302, in some implementations, the search system 115 may not be cloud-based (e.g., may be implemented outside of a cloud computing system) or may be partially cloud-based. For example, the search system 115 may include one or more devices that are not part of the cloud computing system 302, such as the device 400 of FIG. 4, which may include a standalone server or another type of computing device. The search system 115 may perform one or more operations and/or processes described in more detail elsewhere herein.

The network 320 may include one or more wired and/or wireless networks. For example, the network 320 may include a cellular network (e.g., a 5G network, a 4G network, an LTE network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
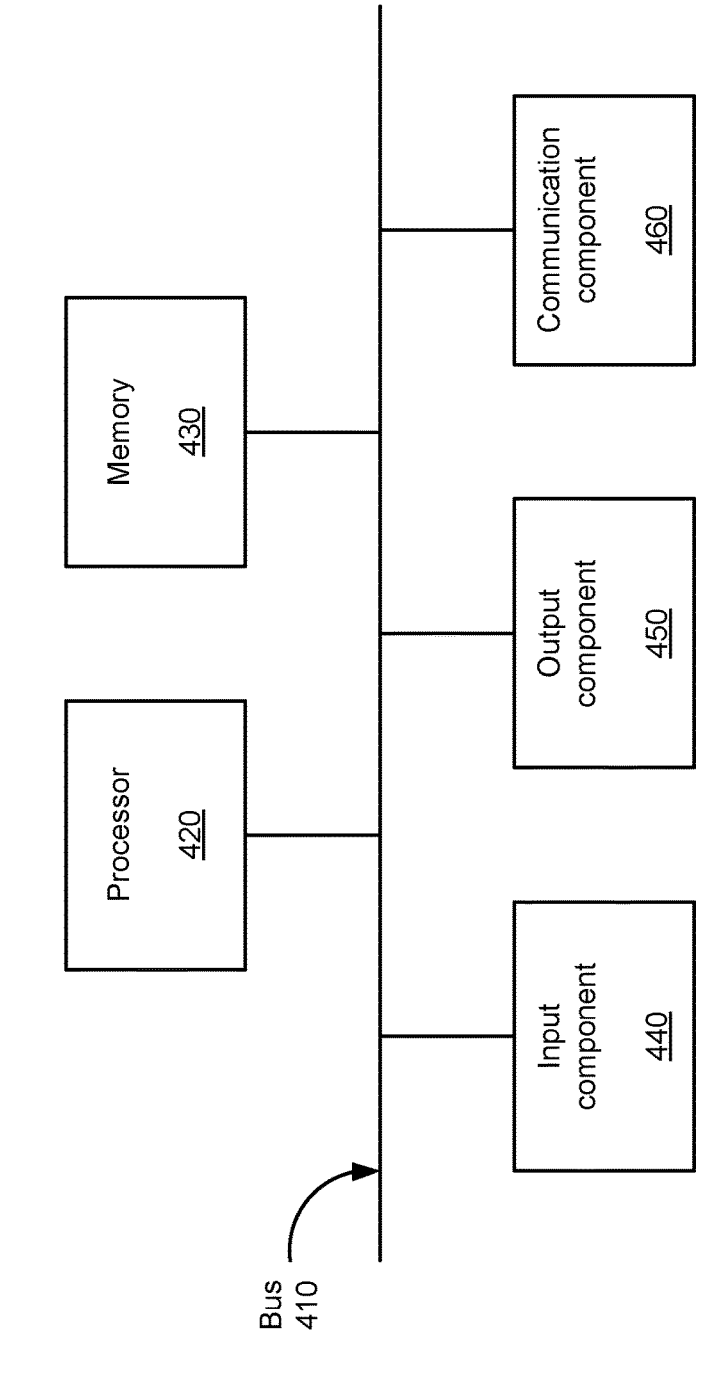
FIG. 4 is a diagram of example components of one or more devices of FIG. 3.

FIG. 4 is a diagram of example components of a device 400, which may correspond to the data structure 105, the user device 110, and/or the search system 115. In some implementations, the data structure 105, the user device 110, and/or the search system 115 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hard-wired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for generating and utilizing a personalized vocabulary for search and recommendations. In some implementations, one or more process blocks of FIG. 5 may be performed by a device (e.g., the search system 115). In some implementations, one or more process blocks of FIG. 5 may be performed by another device or a group of devices separate from or including the device, such as a user device (e.g., the user device 110). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving global metadata terms and aliases, group level metadata terms and aliases, and user level metadata terms and aliases (block 510). For example, the device may receive global metadata terms and aliases, group level metadata terms and aliases, and user level metadata terms and aliases, as described above.

As further shown in FIG. 5, process 500 may include generating global metadata graphs, group level metadata graphs, and user level metadata graphs (block 520). For example, the device may generate global metadata graphs based on the global metadata terms and aliases, group level metadata graphs based on the group level metadata terms and aliases, and user level metadata graphs based on the user level metadata terms and aliases, as described above. In some implementations, the global metadata graphs interconnect the global metadata terms and aliases based on relationships between the global metadata terms and aliases. In some implementations, the group level metadata graphs interconnect the group level metadata terms and aliases based on relationships between the group level metadata terms and aliases. In some implementations, the user level metadata graphs interconnect the user level metadata terms and aliases based on relationships between the user level metadata terms and aliases.

As further shown in FIG. 5, process 500 may include training NLU models with one or more of the global metadata graphs, the group level metadata graphs, and the user level metadata graphs to generate trained NLU models (block 530). For example, the device may train NLU models with one or more of the global metadata graphs, the group level metadata graphs, and the user level metadata graphs to generate trained NLU models, as described above.

As further shown in FIG. 5, process 500 may include receiving a search request from a user (block 540). For example, the device may receive a search request from a user, as described above.

As further shown in FIG. 5, process 500 may include assigning a level to the user and an identifier within the level based on a confidence and prior interactions associated with the user (block 550). For example, the device may assign a level to the user and an identifier within the level based on a confidence and prior interactions associated with the user, as described above.

As further shown in FIG. 5, process 500 may include selecting an NLU model from the trained NLU models based on the level and the identifier assigned to the user (block 560). For example, the device may select an NLU model from the trained NLU models based on the level and the identifier assigned to the user, as described above.

As further shown in FIG. 5, process 500 may include processing the search request, with the NLU model, to generate search results (block 570). For example, the device may process the search request, with the NLU model, to generate search results, as described above.

As further shown in FIG. 5, process 500 may include performing one or more actions based on the search results (block 580). For example, the device may perform one or more actions based on the search results, as described above. In some implementations, performing the one or more actions includes providing the search results for display to the user. In some implementations, performing the one or more actions includes modifying one or more of the global metadata graphs, the group level metadata graphs, or the user level metadata graphs based on the search results. In some implementations, performing the one or more actions includes utilizing the search results with a video streaming service or a music streaming service. In some implementations, performing the one or more actions includes utilizing the search results with an online store or a personal assistant application. In some implementations, performing the one or more actions includes retraining one or more of the trained NLU models based on the search results.

In some implementations, process 500 includes receiving user interactions with the device, and modifying one or more of the group level metadata graphs or one or more of the user level metadata graphs based on the user interactions. In some implementations, modifying one or more of the group level metadata graphs or one or more of the user level metadata graphs includes one or more of adding one or more new group level metadata terms and aliases to the one or more of the group level metadata graphs; adding one or more new user level metadata terms and aliases to the one or more of the user level metadata graphs; or modifying one or more of the global metadata graphs based on modifying one or more of the one or more of the group level metadata graphs or one or more of the user level metadata graphs. In some implementations, modifying one or more of the group level metadata graphs or one or more of the user level metadata graphs includes one or more of removing one or more group level metadata terms and aliases from the one or more of the group level metadata graphs, or removing one or more user level metadata terms and aliases from the one or more of the user level metadata graphs.

In some implementations, process 500 includes receiving user interactions with the device, relinking one or more group level metadata terms and aliases in the one or more of the group level metadata graphs based on the user interactions, and relinking one or more user level metadata terms and aliases in the one or more of the user level metadata graphs based on the user interactions.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a device associated with natural-language-based interactions that include at least one of voice searches or interactive chats for at least one of searching or providing recommendations from media systems utilizing a personalized vocabulary, global metadata terms and aliases, group level metadata terms and aliases, and user level metadata terms and aliases;
generating, by the device, global metadata graphs based on the global metadata terms and aliases, group level metadata graphs based on the group level metadata terms and aliases, and user level metadata graphs based on the user level metadata terms and aliases,
wherein the group level metadata graphs include a plurality of first nodes interconnected by a plurality of first edges representing relationships between the group level metadata terms and aliases, and
wherein the user level metadata graphs include a plurality of second nodes interconnected by a plurality of second edges representing relationships between the user level metadata terms and aliases;
training, by the device, natural language understanding (NLU) models with one or more of the global metadata graphs, the group level metadata graphs, and the user level metadata graphs to generate trained NLU models,
wherein the device performs at least one of processing searches or providing recommendations from the media systems utilizing the personalized vocabulary that is generated based on the generated group level metadata graphs;
receiving, by the device, a search request from a user, wherein the search request is related to the media system;
determining, by the device, a confidence score associated with prior interactions related to the user, wherein the confidence score is associated with a value related to a confidence of a determination of a level the user is related to for at least one of processing searches or providing recommendations from the media systems;
assigning, by the device, the level to the user based on the confidence score, wherein the level is associated with context related to at least one of the global metadata graphs or the user level metadata graphs;
assigning, by the device and to the user, an identifier within the level;
selecting, by the device, an NLU model from the trained NLU models based on the level and the identifier assigned to the user;
processing, by the device, the search request, with the NLU model, to generate search results associated with the at least one of processing searches or providing recommendations from the media systems;
providing, by the device, the generated search results while using a streaming service;
performing, by the device, one or more actions associated with an online service or an application based on the search results,
wherein the one or more actions include instructing the streaming service to utilize the search results and to provide details associated with the search results;
retraining, by the device, the trained NLU models based on increasing a quantity of training data available by utilizing the search results as additional training data for retraining the trained NLU models and based on pruning at least one of the group level metadata graphs or the user level metadata graphs with information received related to user interactions; and
utilizing, by the device, the retrained NLU models for subsequent search requests.

2. The method of claim 1, wherein modifying one or more of the group level metadata graphs or one or more of the user level metadata graphs comprises one or more of:
adding one or more new group level metadata terms and aliases to the one or more of the group level metadata graphs;
adding one or more new user level metadata terms and aliases to the one or more of the user level metadata graphs; or
modifying one or more of the global metadata graphs based on modifying one or more of the one or more of the group level metadata graphs or one or more of the user level metadata graphs.

3. The method of claim 1, further comprising:
translating a user-specific term in the search request to a common term; and
utilize the common term for the search request.

4. The method of claim 1, wherein the one or more actions include at least one of:
recommending products or services based on providing the search results to an online store, or providing the search results to a personal assistant application for further interaction with the user via the personal assistant application.

5. The method of claim 1, wherein the information related to user interactions is received over a time period.

6. The method of claim 1, wherein the pruning is based on:

applying a dampening function that reduces a particular edge weight of a particular edge of the plurality of first edges or the plurality of second edges; and pruning the particular edge or setting the particular edge weight of the particular edge to zero, when the particular edge weight falls below a particular threshold.

7. A device, comprising:

one or more processors configured to:

receive global metadata terms and aliases, group level metadata terms and aliases, and user level metadata terms and aliases, wherein the device is associated with natural-language-based interactions that include at least one of voice searches or interactive chats for at least one of searching or providing recommendations from media systems utilizing a personalized vocabulary;

generate global metadata graphs based on the global metadata terms and aliases, group level metadata graphs based on the group level metadata terms and aliases, and user level metadata graphs based on the user level metadata terms and aliases, wherein the group level metadata graphs include a plurality of first nodes interconnected by a plurality of first edges representing relationships between the group level metadata terms and aliases, and wherein the user level metadata graphs include a plurality of second nodes interconnected by a plurality of second edges representing relationships between the user level metadata terms and aliases;

train natural language understanding (NLU) models with one or more of the global metadata graphs, the group level metadata graphs, and the user level metadata graphs to generate trained NLU models, wherein the device performs at least one of processing searches or providing recommendations from the media systems utilizing the personalized vocabulary that is generated based on the generated group level metadata graphs;

receive a search request from a user, wherein the search request is related to the media system;

determine a confidence score associated with prior interactions related to the user, wherein the confidence score is associated with a value related to a confidence of a determination of a level the user is related to for at least one of processing searches or providing recommendations from the media systems;

assign the level to the user based on the confidence score, wherein the level is associated with context related to at least one of the global metadata graphs or the user level metadata graphs;

assign, to the user, an identifier within the level;

select an NLU model from the trained NLU models based on the level and the identifier assigned to the user;

process, by the device, the search request, with the NLU model, to generate search results associated with the at least one of processing searches or providing recommendations from the media systems;

provide the generated search results while using a streaming service;

perform one or more actions associated with an online service or an application based on the search results, wherein the one or more actions include instructing the streaming service to utilize the search results and to provide details associated with the search results;

retrain the trained NLU models based on increasing a quantity of training data available by utilizing the search results as additional training data for retraining the trained NLU models and based on pruning at least one of the group level metadata graphs or the user level metadata graphs with information received related to user interactions; and utilize the retrained NLU models for subsequent search requests.

8. The device of claim 7, wherein the one or more processors are further configured to:

receive user interactions with the device;

relink one or more of the group level metadata terms and aliases in the at least one of the group level metadata graphs or the user level metadata graphs based on the user interactions; and relink one or more of the user level metadata terms and aliases in the one or more of the user level metadata graphs based on the user interactions.

9. The device of claim 7, wherein the one or more processors, to perform the one or more actions, are configured to:

utilize the search results with a video streaming service or a music streaming service.

10. The device of claim 7, wherein the one or more processors, to perform the one or more actions, are configured to:

utilize the search results with an online store or a personal assistant application.

11. The device of claim 7, wherein the one or more actions include:

instructing a streaming service to provide details associated with the search results; and displaying the details associated with the search results.

12. The device of claim 7, wherein the one or more actions include at least one of:

recommending products or services based on providing the search results to an online store, or providing the search results to a personal assistant application for further interaction with the user via the personal assistant application.

13. The device of claim 7, wherein the one or more processors, when pruning, are further configured to:

apply a dampening function that reduces a particular edge weight of a particular edge of the plurality of first edges or the plurality of second edges; and prune the particular edge or setting the particular edge weight of the particular edge to zero, when the particular edge weight falls below a particular threshold.

14. The device of claim 7, wherein the one or more processors are further configured to:

translate a user-specific term in the search request to a common term; and utilize the common term for the search request.

15. A non-transitory computer-readable medium storing a set of instructions, the set of instructions comprising:

one or more instructions that, when executed by one or more processors of a device, cause the device to:

receive global metadata terms and aliases, group level metadata terms and aliases, and user level metadata terms and aliases, wherein the device is associated with natural-language-based interactions that include at least one of voice searches or interactive chats for at least one of searching or providing recommendations from media systems utilizing a personalized vocabulary;

generate global metadata graphs based on the global metadata terms and aliases;

generate group level metadata graphs based on the group level metadata terms and aliases, wherein the group level metadata graphs include a plurality of first nodes interconnected by a plurality of first edges representing relationships between the group level metadata terms and aliases;

generate user level metadata graphs based on the user level metadata terms and aliases, wherein the user level metadata graphs include a plurality of second nodes interconnected by a plurality of second edges representing relationships between the user level metadata terms and aliases;

train natural language understanding (NLU) models with the global metadata graphs, the group level metadata graphs, and the user level metadata graphs to generate trained NLU models;

receive a search request from a user;

determine a confidence score associated with prior interactions related to the user, wherein the confidence score is associated with a value related to a confidence of a determination of a level the user is related to;

assign the level to the user based on the confidence score, wherein the level is associated with context related to at least one of the global metadata graphs or the user level metadata graphs;

assign to the user, an identifier within the level;

select an NLU model from the trained NLU models based on the level and the identifier assigned to the user;

process the search request, with the NLU model, to generate search results;

provide the generated search results while using a streaming service;

perform one or more actions associated with an online service or an application based on the search results, wherein the one or more actions include instructing the streaming service to utilize the search results and to provide details associated with the search results;

retrain the trained NLU models based on increasing a quantity of training data available by utilizing the search results as additional training data for retraining the trained NLU models and based on pruning at least one of the group level metadata graphs or the user level metadata graphs with information received related to user interactions; and utilize the retrained NLU models for subsequent search requests.

16. The non-transitory computer-readable medium of claim 15, wherein the one or more instructions, that cause the device to modify one or more of the group level metadata graphs or one or more of the user level metadata graphs, cause the device to:

add one or more new group level metadata terms and aliases to the one or more of the group level metadata graphs; or add one or more new user level metadata terms and aliases to the one or more of the user level metadata graphs.

17. The non-transitory computer-readable medium of claim 15, wherein the one or more instructions, that cause the device to modify one or more of the group level metadata graphs or one or more of the user level metadata graphs, cause the device to:

remove one or more group level metadata terms and aliases from the one or more of the group level metadata graphs; or remove one or more user level metadata terms and aliases from the one or more of the user level metadata graphs.

18. The non-transitory computer-readable medium of claim 15, wherein the one or more instructions further cause the device to:

receive user interactions with the device;

relink one or more group level metadata terms and aliases in the one or more of the group level metadata graphs based on the user interactions; and relink one or more user level metadata terms and aliases in the one or more of the user level metadata graphs based on the user interactions.

19. The non-transitory computer-readable medium of claim 15, wherein the one or more actions include:

instructing a streaming service to provide details associated with the search results; and displaying the details associated with the search results.

20. The non-transitory computer-readable medium of claim 15, wherein the one or more actions include at least one of:

recommending products or services based on providing the search results to an online store, or providing the search results to a personal assistant application for further interaction with the user via the personal assistant application.

* * * * *